UNITED STATES PATENT OFFICE.

EDGAR W. SNYDER, OF LOS ANGELES, CALIFORNIA, ASSIGNOR, BY MESNE ASSIGNMENTS, TO OCOTILLO PRODUCTS COMPANY, A CORPORATION OF DELAWARE.

RUBBER COMPOSITION.

1,254,632.      Specification of Letters Patent.      Patented Jan. 22, 1918.

No Drawing.      Application filed August 9, 1917. Serial No. 185,344.

*To all whom it may concern:*

Be it known that I, EDGAR W. SNYDER, a citizen of the United States, residing at Los Angeles, in the county of Los Angeles and State of California, have invented certain new and useful Improvements in Rubber Compositions, of which the following is a specification.

This invention relates to compositions of matter comprising rubber and some other ingredient or ingredients commonly known as rubber compounds.

I have discovered that ocotillo gum when employed as an ingredient of a rubber compound yields a product which is superior to rubber compounds now in use, particularly where such rubber compound is employed in the manufacture of rubber shoes or the like, or what are termed molded goods, such as automobile tire casings, soles and heels for shoes, insulating material for wire, etc., bumpers, gaskets and the like.

The ocotillo plant, (*Fouquieria splendens*) is a small tree which grows in considerable abundance in Northern Mexico, along the Rio Grande and elsewhere. The bark of this plant or tree contains a gum which can be extracted by the use of suitable solvents, such as gasolene, benzin, alcohol, ether and the like, preferably in the presence of approximately from 1 to 3 per cent. of lime or magnesia, from which solvents the gum may be subsequently separated by evaporation or distillation.

In making use of ocotillo gum in the practice of my invention, I preferably mix the gum with Pará rubber, Ceylon rubber, African rubber, Malician rubber, centrals, Castilloa rubber and other plantation and wild rubbers which are generally known in the rubber trade, or mixtures thereof.

The ocotillo gum in the form of a plastic mass is added to the rubber or mixture of rubbers in the usual manner in which added ingredients are added to rubber in making rubber compounds, preferably by maceration of the rubber and gum, whereby a thorough mixture or incorporation of the gum and rubber is effected. This may be effected by the use of mixing rollers as will be understood by those skilled in the art. The proportion of ocotillo gum to the rubber or rubbers will vary according to the use to which the finished product is to be put. Satisfactory results in the manufacture of a rubber compound for use, for example, in making gaskets, bumpers, soles and heels for shoes, automobile tire casings and the like may be produced by the use of one part by weight of ocotillo gum to five parts by weight of rubber. The proportion of ocotillo gum to the rubber may, however, vary widely. I have obtained satisfactory results by the use of 1 part of the gum to 99 parts of rubber in some cases and in other cases have obtained satisfactory results by the use of equal parts of ocotillo gum and rubber. It will be understood therefore that my invention is not limited to the use of any particular proportion of the gum to the rubber. For example, in the manufacture of soles for shoes, I have obtained the best results by the use of 2 parts of gum to 3 parts of plantation rubber.

It appears from experiments made, that the ocotillo gum improves the wearing quality of the finished product and in some cases it appears to increase its elasticity. The adhesiveness of the compound has been found to be greater than that of ordinary rubber and I have found this to be of material advantage in the manufacture of automobile tire casings, the carcass of the casing being more securely cemented or held together by my improved rubber compound than by rubber compounds with which I am familiar. This increased adhesiveness of my improved compound is also of material advantage where such compound is used in the manufacture of hose and belting. It further appears from my experiments that my improved compound is superior in appearance and particularly in the polish exhibited by its surface to that of rubber and rubber compounds with which I am familiar.

While my composition is ordinarily in the form of an elastic rubber-like compound, it is to be understood that the ocotillo gum may be employed in the manufacture of hard rubber compounds such as are used in the manufacture of pump valves, battery jars, insulating material and the like.

It is to be understood that my invention contemplates the use with rubber and ocotillo gum of zinc oxid, carbonate of magnesium, sulfur, litharge, white lead, antimony and other compounds or ingredients now employed in the manufacture of rubber and rubber compounds either alone or together in accordance with the practice in the rubber art, and that my composition is not restricted to the use of any particular rubber or rubber composition, or to any particular proportion of ocotillo gum therewith or to the use of any particular reagents commonly employed in making rubber or rubber compounds except as set forth in the appended claims.

Having thus described my invention, I claim:

1. A rubber composition comprising rubber and ocotillo gum.

2. An elastic composition comprising rubber and ocotillo gum in the approximate proportions of from 1 to approximately 100 parts of ocotillo gum to 100 parts of rubber.

In testimony whereof I affix my signature.

EDGAR W. SNYDER.